(12) United States Patent
Even et al.

(10) Patent No.: US 6,355,924 B2
(45) Date of Patent: *Mar. 12, 2002

(54) CONFIGURABLE PHOTOELECTRIC CELL

(75) Inventors: Stéphane Even, Angouleme; Alain Guillot, Fleac, both of (FR)

(73) Assignee: Schneider Electric SA, Boulogne Billancourt (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/206,255

(22) Filed: Dec. 7, 1998

(30) Foreign Application Priority Data

Dec. 5, 1997 (FR) .......................... 97 15518

(51) Int. Cl.[7] ............................... H01J 40/14
(52) U.S. Cl. ................... 250/214 R; 356/3.08
(58) Field of Search .................... 250/214 R, 559.38, 250/208.1, 201.4, 201.6, 201.1, 559.29, 559.31; 356/3, 3.06, 221, 222, 3.08

(56) References Cited

U.S. PATENT DOCUMENTS

| | | | |
|---|---|---|---|
| 4,026,654 A | * 5/1977 | Beaurain | 356/5.07 |
| 4,331,868 A | * 5/1982 | Mash | 250/239 |
| 4,516,020 A | 5/1985 | Simpson et al. | 250/214 L |
| 4,749,849 A | 6/1988 | Hoeberechts et al. | 250/201.5 |
| 4,755,662 A | * 7/1988 | Fujiwra et al. | 250/201.4 |
| 4,849,781 A | 7/1989 | Nakazawa et al. | 396/120 |
| 5,323,222 A | * 6/1994 | Kunishige | 356/1 |

FOREIGN PATENT DOCUMENTS

EP 0 679 869 A2 11/1995

* cited by examiner

Primary Examiner—Que T. Le
Assistant Examiner—Thanh X. Luu
(74) Attorney, Agent, or Firm—Oblon, Spivak, McClelland, Maier & Neustadt, P.C.

(57) ABSTRACT

Photoelectric cell with means of configuring the operating mode. The cell has several optosensitive zones 11, 12, D capable of outputting magnitudes that are activated or processed in different manners, by configuration and/or processing means 7, 19. The cell may thus be used in reflex mode, proximity mode or proximity with background elimination mode. Amplifying parts 16a, 16b are provided at the side of the optosensitive zones to amplify electrical magnitudes before routing them to the microcontroller 19 in the processing circuit 6.

20 Claims, 3 Drawing Sheets

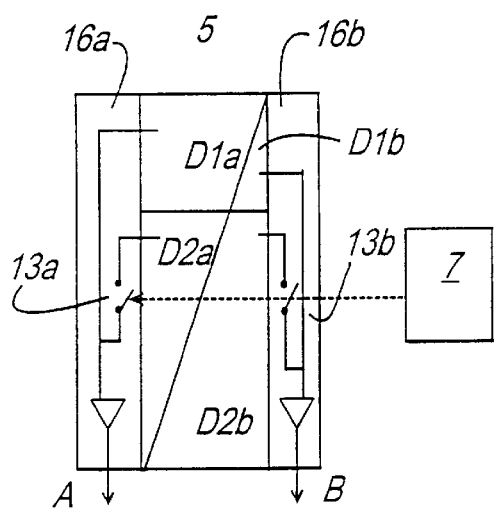
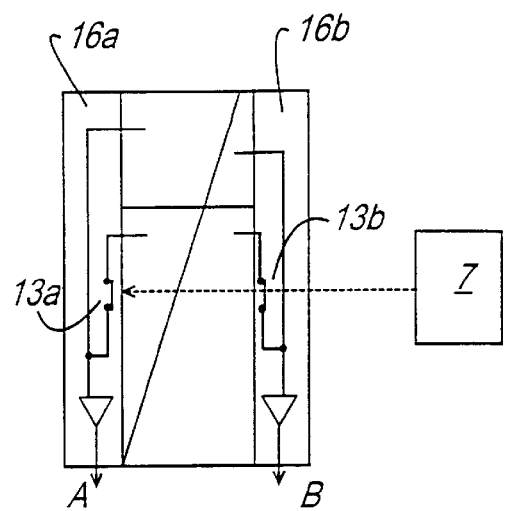
FIG. 3
FIG. 4
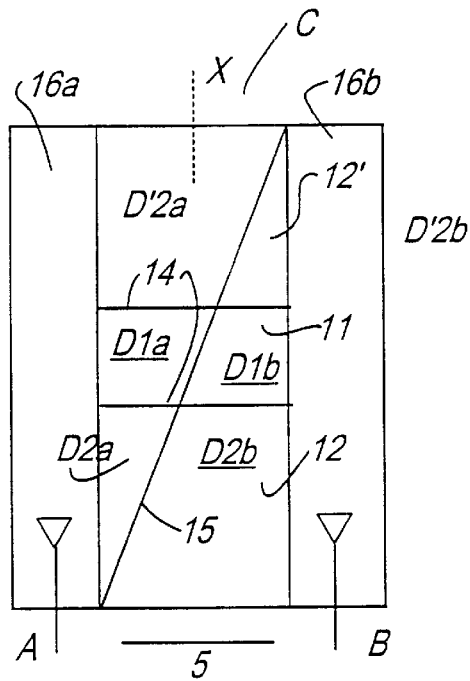
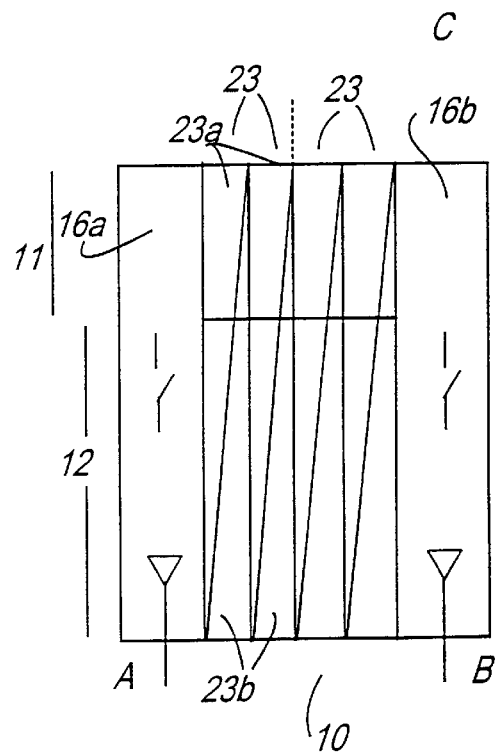
FIG. 5
FIG. 6

CONFIGURABLE PHOTOELECTRIC CELL

BACKGROUND OF THE INVENTION

1. Field of the Invention

This invention relates to a photoelectric cell designed for detection of an object, comprising an optical component equipped with a photosensitive area that generates an electrical reception signal on a conductor as a function of the incidence of an optical beam, and an amplification and processing circuit generating an output signal that depends on the electrical signal.

2. Discussion of the Background

A photoelectric cell is well known. When they operate by detection of a light flow originating from infinity without any proximity effect, they form par of a first family of cells called reflex, polarized reflex or barrage cells. When they operate by detection of light rays at high incidence, they form part of a second family of cells operating either by measurement of energy in a "proximity" subfamily, or by triangulation, comparing two channels of a PSD type component in a "proximity with background elimination" subfamily. Detection modes for these two families will be referred to as "reflex model" and "proximity mode" in the rest of this document, for simplicity. Cells in the first family are used particularly to detect the presence of an object, whereas cells in the second family are used particularly to detect the distance or brightness of an object.

The optical components necessary to make these two families are different. Their surface area is small, typically of the order of 0.6×0.6 mm for reflex cells, but larger and typically with an apparent size 1.6×1.6 mm for proximity cells or 1×2 mm for proximity with background elimination cells. The result is that several types of components need to be procured and stored (typically at least three different components) in order to manage these two product families.

Furthermore, magnetic compatibility constraints affecting photoelectric cells are increasing, whereas the optical components that use them at the present time have the disadvantage that they offer low intrinsic amplification in the case of phototransistors, and even zero amplification in the case of photodiodes.

SUMMARY OF THE INVENTION

The purpose of this invention is to overcome these disadvantages by using simple arrangements that can be taken particularly on the optosensitive component or the processing circuit, so that it becomes easier to make a photoelectric cell insensitive to parasites and capable of operating in different operating modes in order to offer different detection possibilities.

According to a first aspect of the invention, the photoelectric cell comprises configuration means capable of acting on the photosensitive area or the processing circuit in response to a means of selecting a reflex operating mode or a proximity operating mode for the cell.

According to a second aspect of the invention, the photosensitive area is separated by separation into at least two adjacent partial areas isolated from each other, each of these partial areas being capable of supplying electric magnitudes to one of the two channels connected to the amplification and processing circuit, and configuration means are provided to select the operating mode specified for the cell; these configuration means are preferably capable of activating and/or processing electrical magnitudes output from the partial areas, for example by means of switches and/or a microcontroller, as a function of the selected operating mode.

Preferably, and when it is required to configure the cell in reflex mode and in proximity mode the adjacent partial areas are capable of outputting electrical magnitudes to a first conductor and a second conductor connected to the channel and configuration means are provided to activate the first conductor in reflex mode and the second conductor in proximity mode; the photosensitive area used in proximity mode may itself be separated by a demarcation transverse to separation, into isolated adjacent areas that are connected to the respective channels and the surface area of which varies continuously along the main direction of the component, this direction being the direction of displacement of the optical spot of the incident beam on the photoreceptive area in proximity mode.

Preferably, and when it is required to configure the cell in proximity mode or in proximity with background elimination mode, the photosensitive area used may be separated by demarcation transverse to the main direction, into isolated adjacent zones; the surface area of which varies continuously along the main direction of the component, which is an integrated component preferably comprising two amplifying parts of the amplification and processing circuit at the side of the photosensitive area, that amplify the signal originating form the partial areas or photosensitive zones and which are connected through the respective channels to a remaining part of the amplification and processing circuit that controls the configuration described above.

BRIEF DESCRIPTION OF THE DRAWINGS

A more detailed description will now be made of a non-restrictive embodiment of the invention, with reference to the attached drawings.

FIGS. 3 and 4 show the optoreceptive component configured in reflex mode and in proximity mode.

FIG. 5 shows a variant of the component according to the invention.

FIG. 6 shows another variant.

DESCRIPTION OF THE PREFERRED EMBODIMENTS

Figure 1:
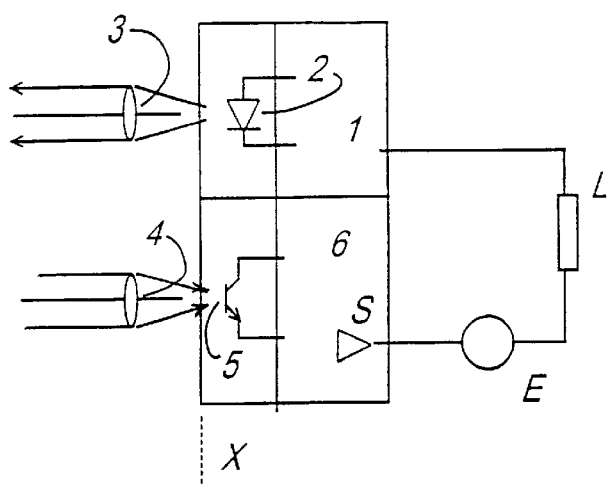
FIG. 1 diagrammatically shows a photoelectric cell.

The photoelectric cell illustrated in FIG. 1 comprises an electronic circuit 1 that generates electrical emission pulses and an emission diode 2 that emits a light beam collimated by a lens 3. The, cell emission assembly does not form part of the invention and will not be described further. The cell also comprises firstly a reception assembly provided with a lens 4 that focuses the received light beam as a function of the presence of an object, an optosensitive device 5 that transforms the received light flux into an electrical magnitude, and an electronic reception circuit 6 that amplifies and processes this magnitude to generate an output signal S that depends on whether or not an object is present. The cell is connected through a link with two or three wires to an energy source E and a load L.

As will be described later, the cell is capable of operating either in reflex mode or in proximity mode as defined above, under the control of configuration means 7.

Figure 2:
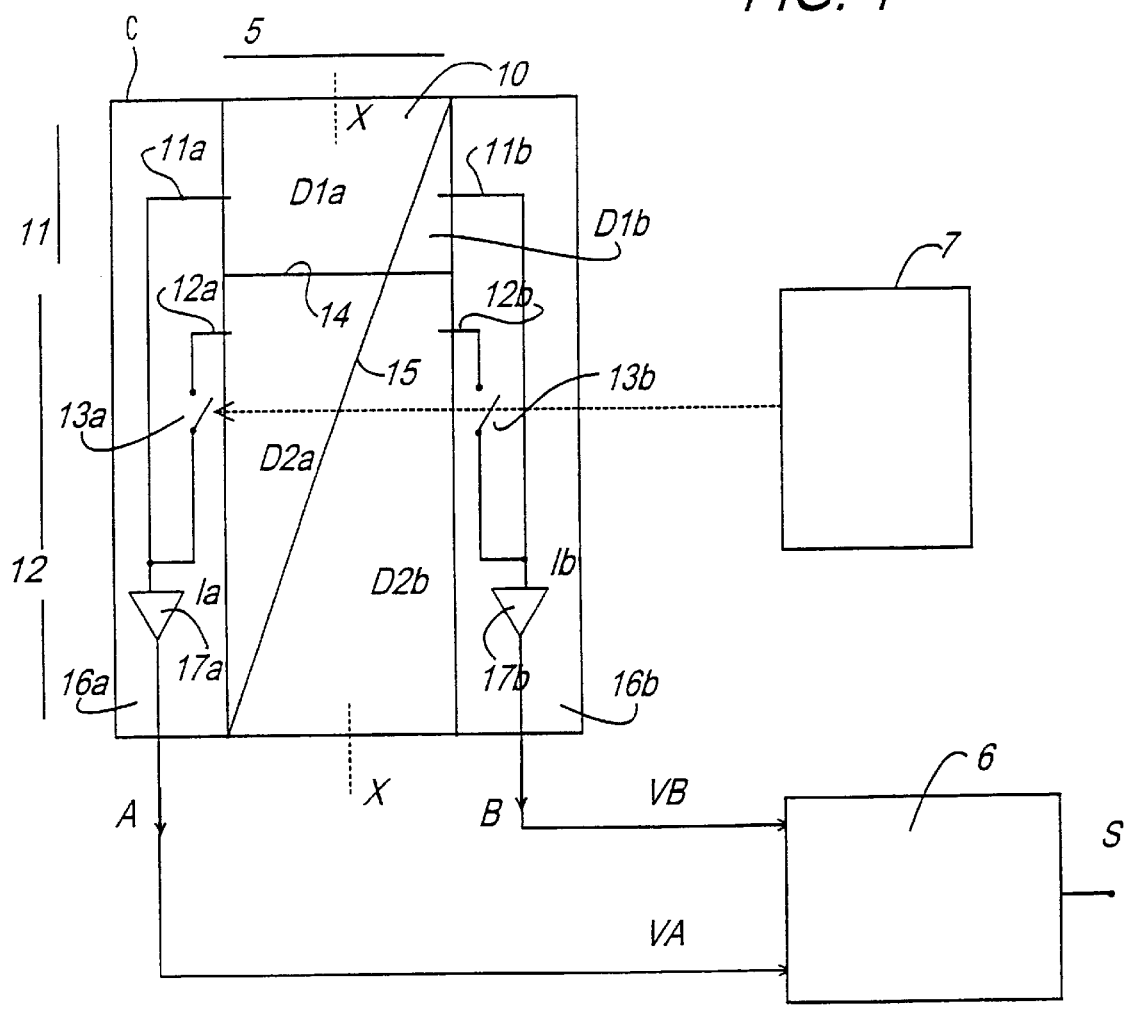
FIG. 2 shows the composition of an optoreceptive component of a photoelectric cell according to the invention.

In the photoelectric cell shown (see FIG. 2), the optosensitive device 5 forms part of an integrated type unit component C that also comprises an amplifying part of the electronic reception circuit. The integrated component C is provided with a photoreceptive area 10 that extends along an X direction corresponding to the direction of displacement of the optical spot during movement of an object to be detected in proximity mode. The photoreceptive area 10 is formed on the surface of an appropriate optosensitive material; it currently operates in photodiode, but it could also operate differently and is separated into two areas 11, 12 isolated from each other and adjacent in the X direction. The areas 11, 12 are isolated along a separation line 14 perpendicular to the X direction.

The partial areas 11, 12 are separated by a demarcation 15 located in skew, for example diagonal, into zones of adjacent isolated trapezoidal or triangular photodiodes D1a, D1b and D2a, D2b respectively, the surface area of which varies approximately continuously along the X direction. This variation may be linear or non-linear. The integrated component C comprises lateral amplifying areas 16a, 16b adjacent to the photosensitive area 10, that are located on the two opposite sides of the component and that at least partly (as we will see later) perform the amplification function for circuit 6. Two connecting channels A, B connect zones 16a and 16b to the rest of circuit 6. The photodiode zones D1a, D2a of areas 11, 12 are connected in parallel to channel A through conductors 11a, 12a, whereas the photodiode zones D1b, D2b of areas 11, 12 are connected in parallel to channel B through conductors 11b, 12b; conductors 12a, 12b are fitted with electronic switches 13a, 13b respectively, acted upon by configuration means 7 to control whether or not these zones are activated.

Figure 8:
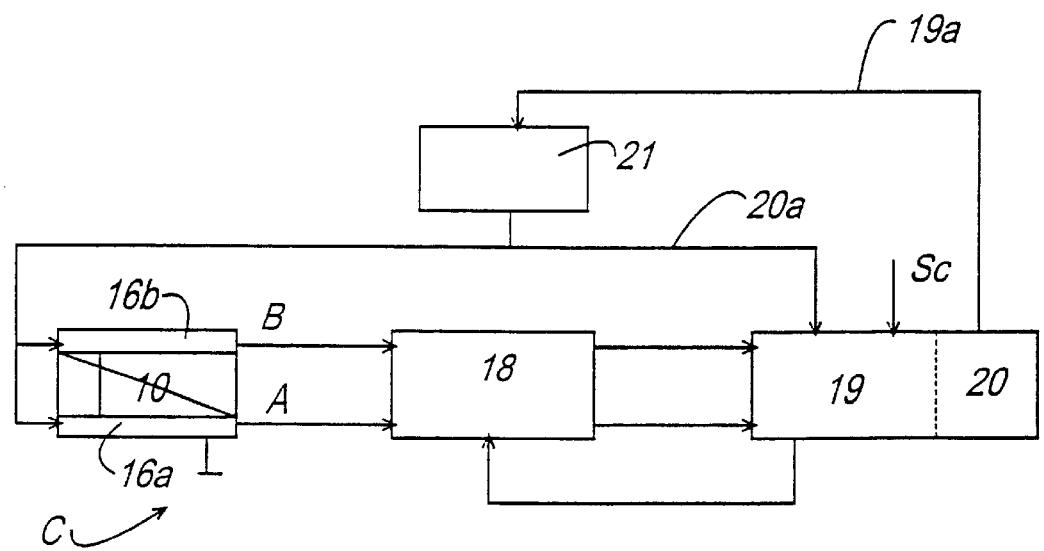
FIG. 8 shows an example of processing applied to voltage signals output by the component.

Currents Ia, Ib transported by conductors 11a, 12a, and 11b, 12b are conducted to amplifying circuits and appropriate ambient light suppressers 17a, 17b located in zones 16a, 16b, and voltages Va, Vb are created on channels A, B which are analyzed in an appropriate part of the electronic reception circuit 6. Consequently (see FIG. 8), circuit 6 comprises for example a sampler-blocker 18 and a microcontroller 19 with an integrated digital-analog converter 20, the reference input 20a of this converter being connected to a programmable voltage regulator 21 that forms part of the configuration means 7. The voltage regulator 21 outputs different voltage levels in reflex and in proximity mode, in response to a reflex/proximity operation signal transmitted by the microcontroller through a line 19a following a configuration order Sc output by a switch or a connection wire.

Figure 7:
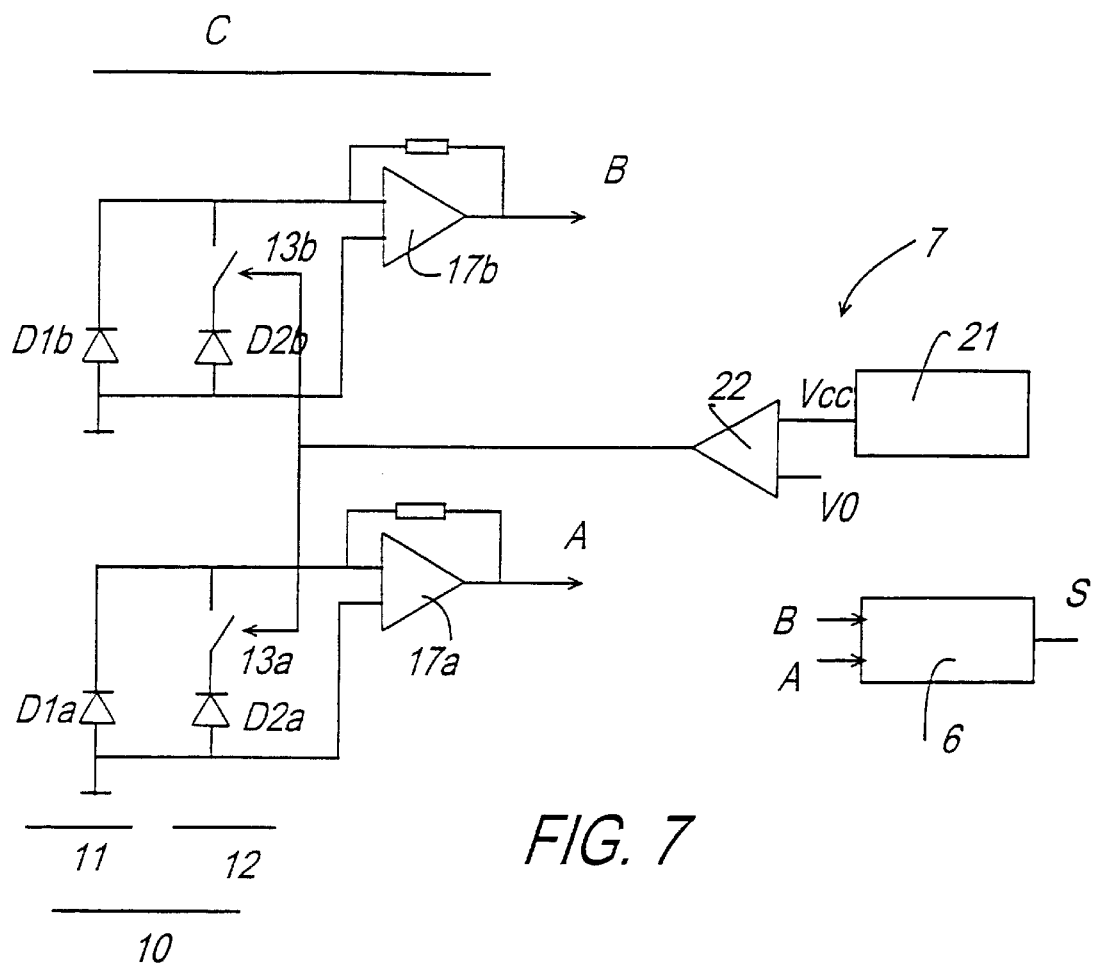
FIG. 7 shows one form of construction of the configuration means.

Apart from programmable voltage regulator 21, the configuration means 7 may comprise (see FIG. 7) a comparator 22, a fixed voltage V0 being applied to one of the inputs of this comparator and a voltage Vcc output by the programmable voltage regulator 21 being applied to the other input. The configuration may be switched through any usual electronic or mechanical means.

As shown in FIG. 5, the photosensitive areas 11, 12 may each be separated into more than two zones by several separations 15. Area 11 (zones D1a, D1b) may be located as shown at the center of the component along the X direction, whereas the area 12 (zones D2a, D2b) and another zone 12' (zones D'2a, D'2b) are located on opposite sides of zone 11 along the X direction.

The photosensitive zones D may be inter-digitate as shown in FIG. 6 to adapt the cell to a light spot smaller than the width of the photosensitive area 10. In this case the area 10 is separated into several rectangles 23 each composed of two triangles 23a, 23b or other zones with surface areas gradually increasing or decreasing along the X direction and with appropriate geometry; triangles 23a being connected to channel A and triangles 23b being connected to channel B.

Depending on the case, the photoelectric cell described may operate in reflex mode or in proximity mode with the same receiving lens 4, or with different lenses.

The photoelectric cell described operates as follows.

In order to operate in reflex mode, the signal Sc with a specific logic level is transmitted to the microcontroller 19, and the microcontroller switches the programmable voltage regulator 21 through line 19a; the regulator 21 outputs its first voltage level and switches 13a, 13b are open (FIG. 3). Only photodiodes D1a, D1b output a current when the photosensitive surface 10 receives the light flux. The voltages Va, Vb resulting from the amplification in amplifiers 17a, 17b are summated by the processing circuit 6, and the output signal switches as a function of the value of this sum.

In order to operate in proximity mode, the signal Sc with the inverse logical level is transmitted to the microcontroller 19 and the microcontroller switches the programmable voltage regulator through line 19a; the regulator 21 outputs its second voltage level and switches 13a, 13b are closed (FIG. 4), All photodiodes D1a, D1b and D2a, D2b output current and voltages Va, Vb are either summated by the microcontroller 19 in the processing circuit 6 (operation in proximity), or are compared with each other by the microcontroller 19 (operation in proximity with background elimination) and the output signal switches as a function of the value of this sum or the result of the comparison.

When it is required to make the cell operate in proximity and proximity with background elimination modes only, line 19a may be omitted and the configuration is made using signal Sc by the microcontroller 19 that decides to summate the voltage signals originating from the various photosensitive zones, or to compare the signals on channels A and B, depending on the required mode.

What is claimed is:

1. A photoelectric cell, comprising:
    an optical component including a photosensitive area having at least first and second isolated-adjacent areas configured to generate first and second electrical signals corresponding to a same incident light beam received on both the first and second isolated-adjacent areas;
    a processing unit having first and second inputs configured to receive the first and second electrical signals generated by the photosensitive area and to generate an output signal based on the received first and second electrical signals;
    a configuration unit connected to the optical component and configured to select an operating mode of the optical component to be one of a proximity operating mode and a reflex operating mode;
    a first conductor configured to connect the first isolated-adjacent area to the first and second inputs of the processing unit; and
    a second conductor including a switch configured to connect the second isolated-adjacent area to the first and second inputs of the processing unit,
    wherein the first isolated-adjacent area operates jointly with the second isolated-adjacent area when the configuration unit selects the proximity operating mode.

2. The photoelectric cell according to claim 1, wherein the configuration unit is connected to the switch and is configured to close the switch to select the proximity operating mode and to open the switch to select the reflex operation mode.

3. The photoelectric cell according to claim 1,
wherein the configuration unit comprises a comparator having an input connected to a voltage Vcc and an output connected to the switch, and
wherein the voltage Vcc is a first value for selecting the reflex operating mode and a second different value for selecting the proximity operating mode.

4. The photoelectric cell according to claim 1, further comprising:
first and second amplification parts on respective sides of the photosensitive area and configured to amplify the first and second electrical signals generated by the photosensitive area.

5. The photoelectric cell according to claim 1,
wherein the processing unit comprises:
a sample-blocker having first and second inputs configured to receive the first and second electrical signals generated by the photosensitive area; and
a microcontroller with an integrated digital-analog converter and having first and second inputs respectively connected to first and second outputs of the sampler-blocker, and
wherein said configuration unit comprises:
a programmable device having an input connected to an output of the microcontroller and configured to output a first signal for selecting the reflex operating mode and a second different signal for selecting the proximity operating mode in response to a reflex/proximity operating signal output by the microcontroller.

6. The photoelectric cell according to claim 1,
wherein the first and second isolated-adjacent areas are separated by a skewed demarcation so as to form two isolated-adjacent zones in the first area and two isolated-adjacent zones in the second area,
wherein the first zone of the first area and the first zone of the second area are connected in parallel to the first input of the processing unit via the first and second conductor, and
wherein the second zone of the first area and the second zone of the second area are connected in parallel to the second input of the processing unit via the first and second conductors.

7. The photoelectric cell according to claim 6, wherein a surface area of the two zones in the first and second areas varies continuously in a main direction defined as a direction of displacement of the incident light on the photosensitive area in the proximity operating mode.

8. The photoelectric cell according to claim 6, wherein a shape of the two zones in the first and second areas comprises one of a trapezoidal shape and a triangular shape.

9. The photoelectric cell according to claim 6, wherein the two zones in the first and second areas comprise inter-digital zones connected to the first and second inputs of the processing unit.

10. A photoelectric cell, comprising:
optical means including a photosensitive area having at least first and second isolated-adjacent areas and for generating first and second electrical signals corresponding to a same incident light beam received on both the first and second isolated-adjacent areas;
processing means having first and second inputs for receiving the first and second electrical signals generated by the photosensitive area and for generating an output signal based on the received first and second electrical signals;
configuration means connected to the optical means for selecting an operating mode of the optical means to be one of a proximity operating mode and a reflex operating mode;
a first conductor for connecting the first isolated-adjacent area to the first and second inputs of the processing means; and
a second conductor including a switch for connecting the second isolated-adjacent area to the first and second inputs of the processing means,
wherein the first isolated-adjacent area operates jointly with the second isolated-adjacent area when the configuration means selects the proximity operating mode.

11. The photoelectric cell according to claim 10, wherein the configuration means is connected to the switch and closes the switch to select the proximity operating mode and opens the switch to select the reflex operation mode.

12. The photoelectric cell according to claim 10, wherein the configuration means comprises:
a comparator having an input connected to a voltage Vcc and an output connected to the switch, and
wherein the voltage Vcc is a first value for selecting the reflex operating mode and a second different value for selecting the proximity operating mode.

13. The photoelectric cell according to claim 10, further comprising:
first and second amplification means of respective sides of the photosentitive area for amplifying the first and second electrical signals generated by the photosensitive area.

14. The photoelectric cell according to claim 10,
wherein the processing means comprises:
a sample-blocker means having first and second inputs for receiving the first and second electrical signals generated by the photosensitive area; and
a microcontroller with an integrated digital-analog converter and having first and second inputs respectively connected to first and second outputs of the sampler-blocker means, and
wherein said configuration means comprises:
a programmable means having an input connected to an output of the microcontroller for outputting a first signal for selecting the reflex operating mode and a second different signal for selecting the proximity operating mode in response to a reflex/proximity operating signal output by the microcontroller.

15. The photoelectric cell according to claim 10,
wherein the first and second isolated-adjacent areas are separated by a skewed demarcation so as to form two isolated-adjacent zones in the first area and two isolated-adjacent zones in the second area,
wherein the first zone of the first area and the first zone of the second area are connected in parallel to the first input of the processing means via the first and second conductor, and
wherein the second zone of the first area and the second zone of the second area are connected in parallel to the second input of the processing means via the first and second conductors.

16. The photoelectric cell according to claim 15, wherein a surface area of the two zones in the first and second areas varies continuously in a main direction defined as a direction of displacement of the incident light on the photosensitive area in the proximity operating mode.

17. The photoelectric cell according to claim 15, wherein a shape of the two zones in the first and second areas comprises one of a trapezoidal shape and a triangular shape.

18. The photoelectric cell according to claim 15, wherein the two zones in the first and second areas comprise interdigital zones connected to the first and second inputs of the processing means.

19. A photoelectric cell, comprising:

an optical component including a photosensitive area having at least first and second isolated-adjacent areas configured to generate first and second electrical signals corresponding to a same incident light beam received on both the first and second isolated-adjacent areas;

a processing unit having first and second inputs configured to receive the first and second electrical signals generated by the photosensitive area and to generate an output signal based on the received first and second electrical signals; and a configuration unit connected to the optical component and configured to select an operating mode of the optical component to be one of a proximity operating mode and a reflex operating mode, wherein the first isolated-adjacent area operates jointly with the second isolated-adjacent area when the configuration unit selects the proximity operating mode, and wherein the processing unit only receives signals from the first isolated-adjacent area when the configuration unit selects the reflex operating mode.

20. A photoelectric cell, comprising:

optical means including a photosensitive area having at least first and second isolated-adjacent areas and for generating first and second electrical signals corresponding to a same incident light beam received on both the first and second isolated-adjacent areas;

processing means having first and second inputs for receiving the first and second electrical signals generated by the photosensitive area and for generating an output signal based on the received first and second electrical signals; and configuration means connected to the optical means for selecting an operating mode of the optical means to be one of a proximity operating mode and a reflex operating mode, wherein the first isolated-adjacent area operates jointly with the second isolated-adjacent area when the configuration means selects the proximity operating mode, and wherein the processing means only receives signals from the first isolated-adjacent area when the configuration means selects the reflex operating mode.

* * * * *